April 22, 1958     I. A. WEAVER     2,831,265
GAUGE ATTACHING CLAMP FOR AUTOMOTIVE VEHICLES
Filed May 1, 1953     3 Sheets-Sheet 1

INVENTOR.
Ira A. Weaver,
BY

April 22, 1958     I. A. WEAVER     2,831,265
GAUGE ATTACHING CLAMP FOR AUTOMOTIVE VEHICLES
Filed May 1, 1953     3 Sheets-Sheet 2

INVENTOR.
Ira A. Weaver,
BY

April 22, 1958   I. A. WEAVER   2,831,265
GAUGE ATTACHING CLAMP FOR AUTOMOTIVE VEHICLES
Filed May 1, 1953   3 Sheets-Sheet 3

INVENTOR.
Ira A. Weaver,
BY

United States Patent Office 2,831,265
Patented Apr. 22, 1958

2,831,265
GAUGE ATTACHING CLAMP FOR AUTOMOTIVE VEHICLES

Ira A. Weaver, Springfield, Ill., assignor to Weaver Manufacturing Company, Springfield, Ill., a corporation of Illinois Application May 1, 1953, Serial No. 352,510
19 Claims. (Cl. 33—203.18)

This invention relates, in general, to a gauge attaching clamp for automotive vehicles, and has particular relation to an improved gauge attaching clamp for attaching in cooperative association with a vehicle part a gauge for measuring, for example, such factors as camber, king pin inclination, caster, and toe of the front wheels of automotive vehicles.

It has been common practice in the automotive industry to journal the front wheels of automotive vehicles on spindles pivotally secured to the outer ends of the axle by pivot pins commonly known as king pins. These king pins are commonly inclined somewhat from the vertical longitudinally of the vehicle to provide for stabilization and ease of steering. This angle of inclination of the king pins from the vertical is known as the "caster."

It is also common to incline the king pins transversely of the vehicle. This is known as king pin inclination.

It is further common to incline the wheel spindles slightly downwardly to set the front wheels of the vehicle somewhat closer together at the bottom than at the top. This is known as cambering. The idea of cambering is to bring the point of contact of the tires with the road more nearly under the steering spindles or king pins, thus permitting the vehicle to be steered more easily.

To offset the wearing action on the tires, for example, by the camber, and to produce more even wear on them, the wheels are slightly toed-in at the front. An additional reason for this is that, when the car is running at high speeds, the wheels have a tendency to toe-out. If toe-in is too much, or not enough, the treads of the tires will grind.

One of the main objects of the present invention is to provide an improved gauge attaching clamp which may be easily and quickly attached to a motor vehicle front wheel spindle, or, more particularly, to the spindle nut and to which gauging means may be easily attached.

Another object is to provide a gauge attaching clamp which may be attached to any motor vehicle spindle nut which may be encountered on present day motor vehicles. This is advantageous since spindles and nuts vary in size on various vehicles.

Another object is to provide a gauge attaching clamp which may be attached in place without removing the spindle nut which is advantageous since at least some car manufacturers do not want this nut removed.

Another object is to provide a gauge attaching clamp which when the clamp is attached in place is held against a plane surface of the vehicle and more particularly against a wheel bearing surface and presents another plane surface against which a plane surface of a gauge or gauge supporting part may bear to assure that the plane surface of the gauge or gauge supporting part is parallel with the plane surface of the vehicle against which the clamp is held and that the gauge or gauge supporting part is thus accurately positioned for the desired gauging operations.

Another object is to provide a gauge attaching clamp having an adapter member provided with a pair of plane surfaces, and clamping means for clamping one of the plane surfaces of the adapter member in cooperation with the wheel bearing surface and gauging means against the other plane surface of the adapter member.

Another object is to provide a gauge attaching clamp having a yoke with arms for disposition over the spindle nut; a pointed member carried by one of the yoke arms for location in one of the slots of the nut; a screw carried by the other yoke arm and having a pointed end for location in an opposite slot in the nut; a threaded stud freely pivoted to the yoke; an adapter sleeve over the stud and having diametrically opposite slots for receiving the arms of the yoke and permitting the yoke to slide in the slots with relatively close fit; the adapter sleeve having a pair of parallel plane surfaces; and a nut screwed on the stud and effective, when the yoke is attached to the spindle nut, to clamp one of the plane surfaces of the adapter sleeve in cooperation with the wheel bearing surface and gauging means against the other plane surface of the adapter sleeve.

Another object is to provide a gauge attaching clamp of the aforementioned character in which there is a compression spring positioned over the stud and within the adapter sleeve which spring bears at one end against the yoke and at its other end against the adapter sleeve and acts endwise between the adapter sleeve and the yoke.

Another object is to provide a gauge attaching clamp of the aforementioned character in which there is a first compression spring positioned over the stud and within the adapter sleeve which spring bears at one end against the yoke and at the other end against the adapter sleeve and acts endwise between the adapter sleeve and the yoke, and a second compression spring positioned over the stud and acting endwise between the adapter sleeve and the nut screwed on the stud which second spring is stronger than the first spring.

Another object is to provide a gauge attaching clamp of the aforementioned character in which there is a spherical segment shaped washer positioned over the stud with its convex side positioned for cooperation with gauging means and in which the nut screwed on the stud has a spherical segment shaped inner end for cooperation with the outer concave side of the washer.

Further objects and advantages of the invention will be apparent from the following detailed description taken in connection with the accompanying drawings, it being understood that the invention is limited only within the scope of the appended claims and not to the particular embodiment selected for illustration.

In the drawings:

Figure 4 is a fragmentary detailed section through the pivotal connection between the threaded stud and the yoke of the adapter clamp taken on the line 4—4 of Figure 2;

Figure 5 is a top plan view of the gauge attaching clamp;

Figure 6 is an inner end view of the gauge attaching clamp; and

Figure 7:
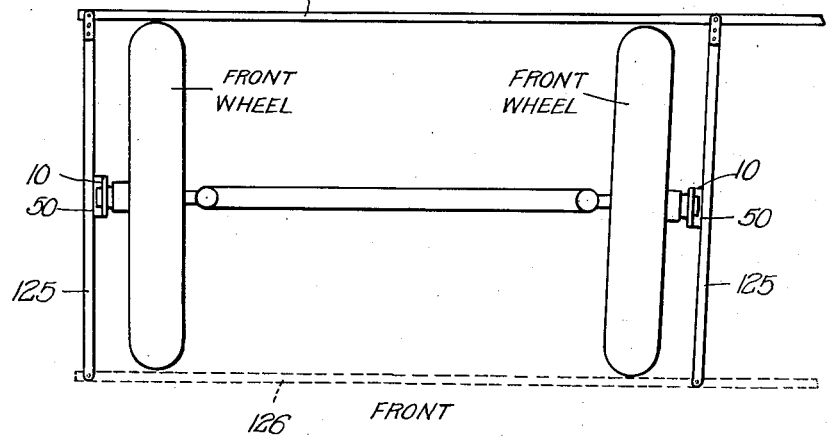

Figure 7 is a diagrammatic top plan view showing the two front wheels of a motor vehicle with an alignment gauge attached to each spindle by gauge attaching clamps according to the present invention; also showing a toe-in bar attached to each gauge, and a bar or tram in position for measuring the distance between the rear ends of the two toe-in bars, and the same tram, in dotted lines, in position for measuring the distance between the front ends of the two toe-in bars.

Figure 2:
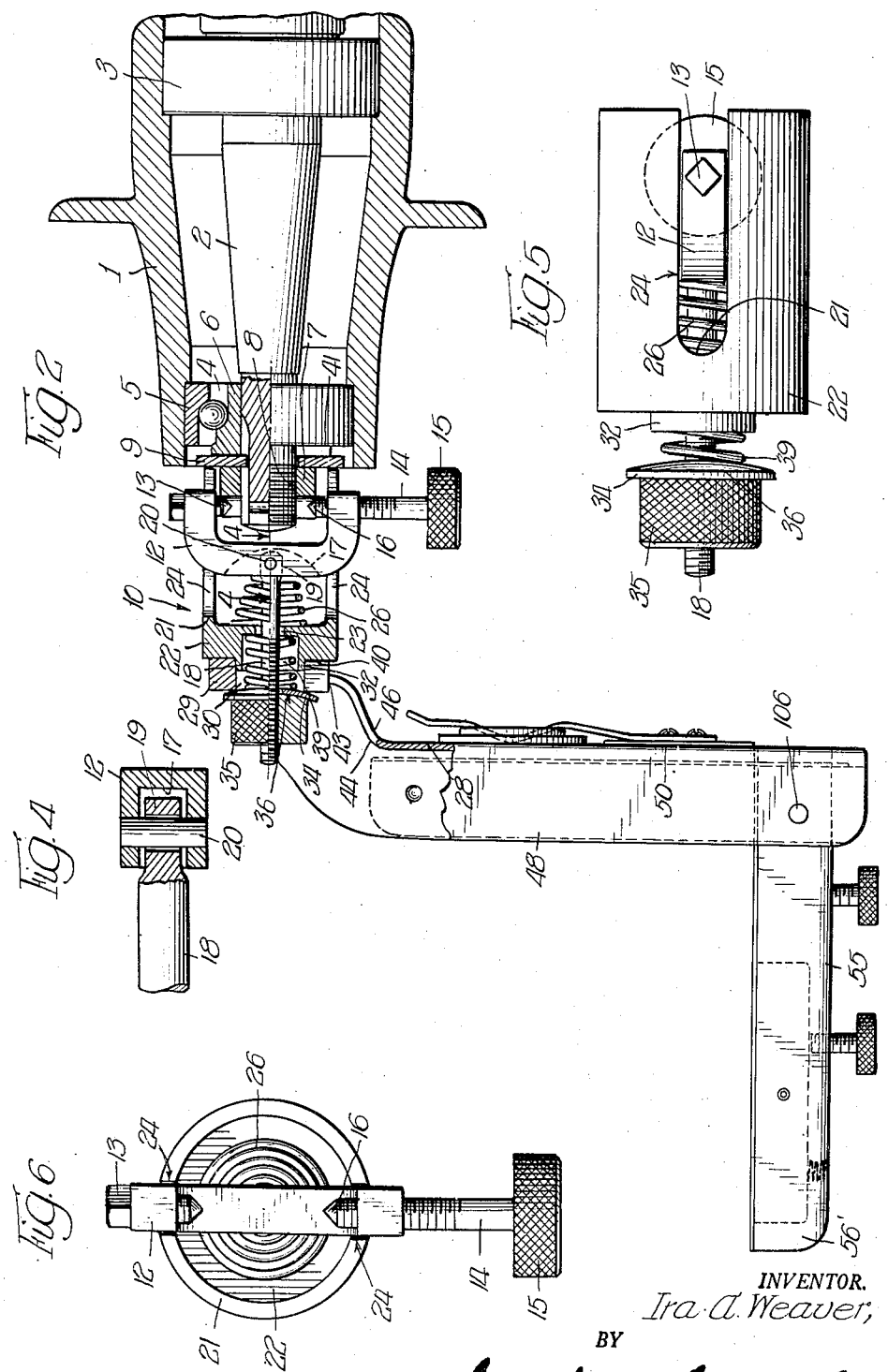
Figure 2 is a fragmentary vertical section taken axially through one of the wheel hubs, the gauge attaching clamp and the adjacent part of the alignment gauge.
Figure 3:
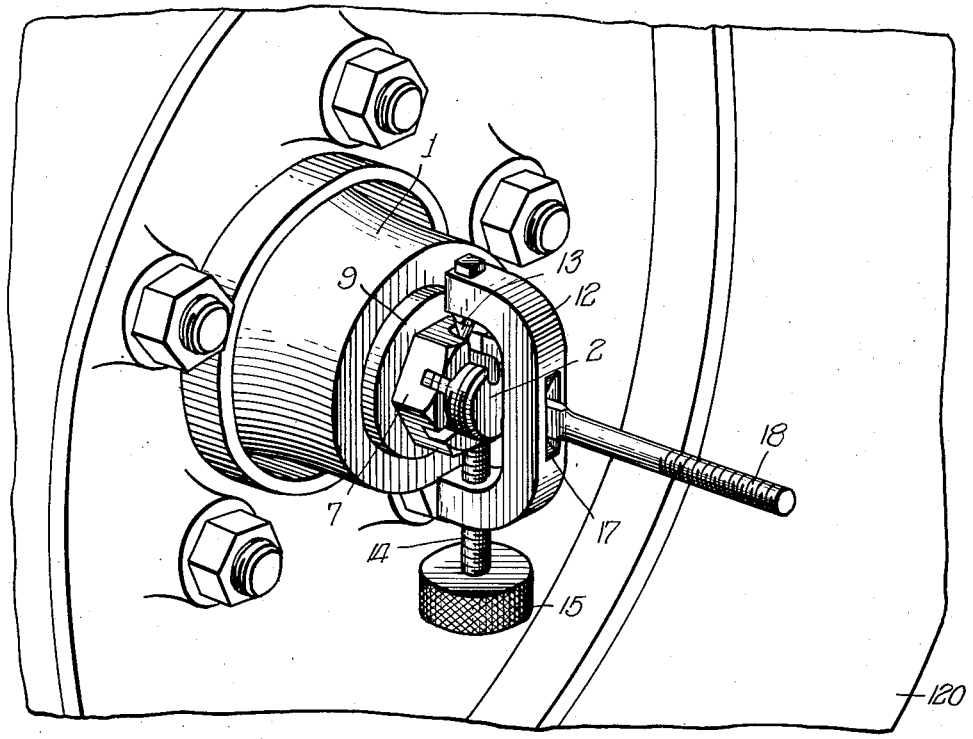
Figure 3 is a perspective view with the adapter sleeve removed to show how the clamp is attached by locating its points in cotter key slots of the spindle nut.

Referring to the drawings, in Figure 2 the reference numeral 1 designates the wheel hub for one of the front wheels of an automotive vehicle.

Within the hub 1 is the wheel spindle 2 provided with an inner bearing 3 and an outer bearing 4. The outer bearing 4 has an outer race 5 and an inner race 6. A spindle nut 7 of castellated form is screwed at 8 on the spindle 2 with a thrust washer 9 interposed between adjacent ends of the inner bearing race 6 and the nut 7. The aforementioned structure is illustrative of one form of such structure as currently employed, with size variations, on various vehicles.

The embodiment of the gauge attaching clamp of the present application selected for illustration is shown as used in attaching an alignment gauge of the form disclosed and claimed in applicant's copending application Serial No. 352,183, filed April 30, 1953, and designated, in general, by the reference numeral 10, to the wheel spindle. The form of the alignment gauge or other gauge with which the attaching clamp of the present invention is adapted for use may vary within the scope of this invention.

The attaching clamp comprises a yoke or clamp member 12 having arms for disposition over the spindle nut 7. A hard pointed set screw or other pointed member 13 is fixed in one arm of the yoke. The opposite arm of the yoke 12 contains a threaded hole diametrically opposite the pointed member 13 through which is screwed a screw 14 in axial alignment with the set screw 13. The screw 14 has a knurled head 15 at its outer end and is provided at its inner end with a hardened point 16.

The base or intermediate portion of the yoke 12 has a groove 17 which opens outwardly away from the spindle 2. The inner end of the groove 17 may be of rounded or arcuate form as shown, for example, in dotted lines in Figure 2. A threaded stud 18 has a flattened head 19 which enters the groove 17 and is retained therein by a pin 20. The groove 17 is of free fit with the sides of the flattened head 19 and the pin 20 has loose fit in the hole through the head 19 of the stud. Thus, the stud 18 is permitted to pivot a limited amount sidewise due to looseness between the sides of the head of the stud and the sides of the groove 17. Also, the groove 17 due to its form and length vertically at its open end as shown in Figure 2 permits the stud 18 to pivot vertically a limited amount about the pin 20. Thus the stud 18 is permitted to swivel freely a limited amount in all directions.

Figure 1:
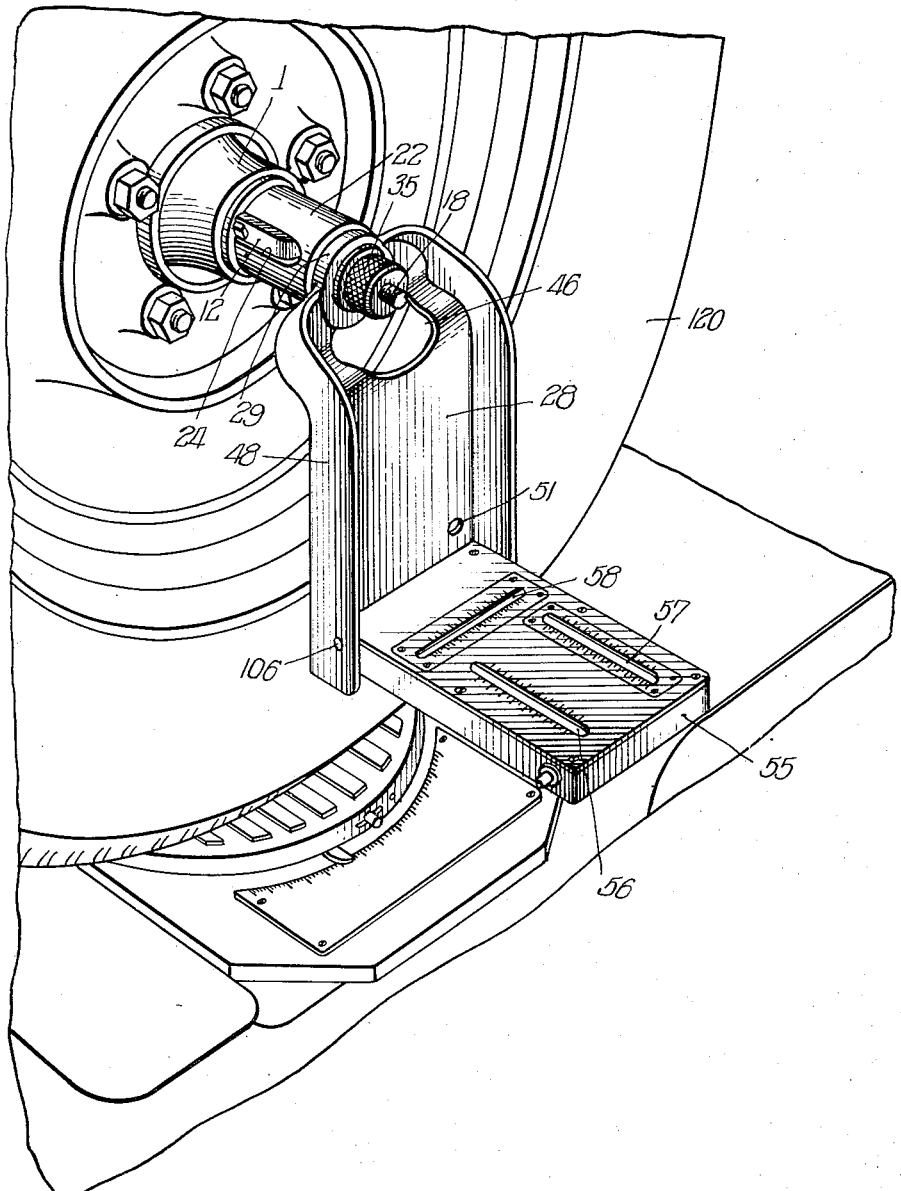
Figure 1 is a fragmentary view of one of the front wheels of an automobile showing the same positioned on a turntable or turning radius gauge for measuring the amount of wheel turn and with an alignment gauge attached to the wheel spindle by a gauge attaching clamp embodying the present invention.

The adapter sleeve 21 is of cylindrical form. One end of this sleeve is open and the opposite end is closed by a relatively thick wall 22 having an axial opening 23 through which the stud 18 passes in applying the sleeve 21 over the yoke 12 and its connected stud 18. The opening 23 is considerably larger than the stud 18 so that the stud may swivel a limited amount about the pin 20 without moving the sleeve 21. Diametrically opposite sides of the cylindrical wall of the adapter sleeve 21 are provided with slots 24, 24 for receiving the ends of the yoke 12. The slots 24 are wide enough to permit the yoke to slide in them as shown in Figures 1 and 2 with relatively close fit.

A conical shaped compression spring 26 is placed over the stud 18 with its smaller end bearing against the yoke 12 and its larger end bearing against the inside of the end wall 22 of the adapter sleeve 21. Thus the spring 26 when under compression tends to push the sleeve 21 endwise away from the yoke 12. The gauge 10 has a back plate 28 which is positioned upright when the gauge is applied to a spindle. This back plate 28 has at the top thereof an integral boss 29 provided with an opening 30 which in applying the gauge to the yoke and stud assembly passes over the stud 18 and engages telescopically over an annular flange 32 integral with the end wall 22 of the adapter sleeve 21 about the opening 23. A dished or spherical segment shaped washer 34 has an opening which passes freely over the stud 18 and its convex side engages the boss 29 of the back plate 28 around the periphery of the opening 30. A knurled nut 35 is screwed on the outer end of the stud 18 and preferably has a rounded or spherical segment shaped inner end 36 of the same radius as the concave side of the washer 34 which engages or cooperates with the concave outer side of the washer 34.

The outer surface of the end wall 22 of the sleeve 21 is counterbored as indicated at 38 to receive a helical compression spring 39. This spring is placed over the stud 18 with one end bearing against the end wall 22 at the inner end of the counterbore 38 and its opposite end bearing against the washer 34. The spring 39 is somewhat stronger and has less deflection per unit load than the spring 26. The spring 39 is thus effective to keep the inner end of the adapter sleeve 21 in contact with the thrust washer 9 in applying the gauge to the wheel spindle.

The end surfaces 40 and 41 of the adapter sleeve 21 are plane surfaces parallel to each other, so that when the surface 41 is held against any plane surface, such, for example, as the outer plane surface of the thrust washer 9, another plane surface such, for example, as the plane cooperating surface of the boss 29 bearing against the surface 40 will be parallel to the first plane surface against which the surface 41 bears.

The bottom of the boss 29 has a slot 43 opening therethrough from the opening 30 into an opening 44 in the upper end of the gauge plate 28. The opening 44 is preferably sufficiently large to permit passage of the nut 35 and washer 34 therethrough which enables applying the gauge plate 28 to the adapter sleeve 21 without completely unscrewing the nut 35 from the stud 18.

The side of the plate 28 which is presented toward the wheel of the vehicle in use has a raised plane or parallel surface 50 against which a toe bar is adapted to be held for toe gauge purposes as will hereinafter appear. The plate 28 has two holes 51 drilled therein to receive dowel pins for positioning such toe gauge bar parallel with the surface 50 and therefore parallel with the surface of the washer 9 with which the adapter sleeve 21 cooperates.

The details of the alignment gauge 10 per se form no part of the present invention and may be ascertained more fully by reference to the aforementioned copending application, it being deemed necessary here merely to point out the essential features which cooperate with the gauge attaching clamp of the present application.

Suffice it here to state that the gauge carrying member 55 is pivoted to the bracket 48 at 106 and has mounted therein three spirit level gauges 56, 57 and 58. The gauge 56 is a camber gauge and is disposed parallel with the wheel spindle 2 in use. The gauge 57 is a caster and camber correction gauge and is also disposed parallel with the wheel spindle 2 in use. The gauge 58 is a king pin inclination and caster correction gauge and is disposed transversely or at right angles to the gauges 56 and 57 and therefore transversely or at right angles to the wheel spindle in use.

The operation of the gauge attaching clamp of the present application for attaching, for example, the gauge 10 for measuring the camber, king pin inclination and caster of the front wheels is as follows:

The car is first prepared by making sure that it is on a level surface and all tires are inflated to normal pressure. Any looseness in the front end system of the vehicle is eliminated and the vehicle is preferably bounced to obtain normal road position of all springs.

Then, starting with either the right or left front wheel, both the hub cap and the dust cap are removed. The spindle nut 7 is then tightened to eliminate any wheel bearing looseness and any excess grease is wiped from the spindle nut and bearing thrust washer.

The adapter clamp is then fastened to the spindle nut 7 as shown in Figure 2 by locating the clamp point 13 and the point of the adjusting screw 14 in opposite castellations or cotter key slots in the nut 7 and firmly tightening the knurled headed adjusting screw. This provides a means for quickly and accurately clamping the adapter sleeve and gauge to the wheel. This is accomplished without removing the adapter sleeve assembly from the gauge, and without removing the spindle nut, removal of which nut as previously set forth is not desired by at least some car manufacturers.

The gauge and adapter sleeve assembly are then held with the inner end of the adapter sleeve 21 against the thrust washer 9 as shown in Figures 1 and 2. Making sure that the sleeve 21 is centered on the thrust washer 9, the knurled centering nut 35 is tightened until it holds the gauge firmly against the bearing thrust washer 9. If the bearing thrust washer diameter is too small to fit the adapter sleeve, a special ground washer may be slipped over the slotted nut 7 between the thrust washer 9 and the adjacent end of the adapter sleeve.

Then, with the gauge thus accurately positioned against the plane surface of the adapter sleeve 21 and the parallel plane surface 41 of the adapter sleeve held against the outer plane surface of the thrust washer 9 or any other washer applied as described, the camber, king pin inclination and caster may be gauged and the readings recorded and corrections made, for example, as more fully disclosed in my copending application previously identified herein.

Where it is desired to gauge the toe of the front wheels of the vehicle, a gauge 10 is applied to the spindle nut 7 of each front wheel in the manner hereinbefore described. A toe bar 125 is then attached to the gauge plate 28 of each gauge in position seating against the respective parallel surfaces 50. The seating of the toe bars 125 against the parallel surfaces 50 assures that the bars 125 are accurately parallel with the surfaces. A crossbar 126 is then applied transversely across the inner ends of the bars 125 as shown in full lines in Figure 7 to measure the distance between the rear ends of the bars 125. Then, when that has been done, the crossbar 126 is applied transversely across the front ends of the toe bars 125 as shown in dotted lines in Figures 7 for measuring the distance between the front ends of the bars 125. In this way the toe-in of the front wheels may be readily and accurately determined and correction made as suitable or desired.

In the toe gauging operation, other supports than the gauges 10 may be used for supporting the toe bars 125 as long as such supports have plane parallel surfaces one to be held held against the outer plane surfaces of the washers 9 or parallel with the wheel bearing surfaces and the other for seating the support and thereby the toe bars 125 parallel with the wheel bearing surfaces.

The embodiment of the invention shown in the drawings is for illustrative purposes only and it is to be expressly understood that said drawings and the accompanying specification are not to be construed as a definitioun of the limits or scope of the invention, reference being had to the appended claims for that purpose.

I claim:

1. Gauge attaching means for a vehicle having a wheel hub mounted by anti-friction bearing means on a wheel spindle comprising, in combination, an attaching member attached to said wheel spindle against movement axially with respect to said spindle, an adapter member, said adapter member having a pair of planar surfaces, a threaded stud connected to said attaching member, and a nut screwed on said stud, said threaded stud affording cooperation between said nut and said adapter member effective to clamp one of said planar surfaces of said adapter member in cooperation with a surface of said wheel bearing means and gauge supporting means against the other planar surface of said adapter member.

2. Gauge attaching means according to claim 1 wherein said attaching member is positioned within the length of said adapter member and between the planar surfaces thereof.

3. A gauge attaching clamp for a vehicle having a wheel hub mounted by anti-friction bearing means on a wheel spindle and a spindle nut on said spindle comprising, in combination, a clamp member, means for clamping said clamp member to said spindle nut, an adapter member, said adapter member having a pair of plane surfaces, a threaded stud freely pivoted to said clamp member, and a nut screwed on said stud, said threaded stud affording cooperation between said nut and said adaptor member to render said nut effective to clamp one of said plane surfaces of said adapter member in cooperation with a surface of said bearing means, and gauge supporting means against the other plane surface of said adapter member.

4. A gauge attaching clamp for a vehicle having a wheel hub mounted by anti-friction bearing means on a wheel spindle and a spindle nut on said spindle comprising, in combination, a clamp member, means for clamping said clamp member to said spindle nut, an adapter member, said adapter member having a pair of plane surfaces, a threaded stud freely pivoted to said clamp member, a nut screwed on said stud, said threaded stud affording cooperation between said nut and said adaptor member to render said nut effective to clamp one of said plane surfaces of said adapter member in cooperation with a surface of said bearing means and gauge supporting means against the other plane surface of said adapter member, and a compression spring positioned over said stud and bearing at one end against said clamp member and at its other end against said adapter member.

5. A gauge attaching clamp for a vehicle having a wheel hub mounted by anti-friction bearing means on a wheel spindle and a spindle nut on said spindle comprising, in combination, a clamp member, means for clamping said clamp member to said spindle nut, an adapter member, said adapter member having a pair of plane surfaces, a threaded stud freely pivoted to said clamp member, a nut screwed on said stud, said threaded stud affording cooperation between said nut and said adaptor member to render said nut effective to clamp one of said plane surfaces of said adapter member in cooperation with a surface of said bearing means and gauge supporting means against the other plane surface of said adapter member, a first compression spring positioned over said stud and bearing at one end against said clamp member and at its other end against said adapter member, said first compression spring tending to push said adapter member endwise relative to said clamp member, and a second compression spring positioned over said stud and acting endwise between said adapter member and the nut screwed on said stud, said second spring being stronger than said first spring and effective to keep the surface of said adapter member which cooperates with said surface of said bearing means in cooperation with said surface in applying the clamp to said spindle nut.

6. A gauge attaching clamp for a vehicle having a wheel hub mounted by anti-friction bearing means on a wheel spindle and a spindle nut on said spindle comprising, in combination, a clamp member, means for clamping said clamp member to said spindle nut, an adapter member, said adapter member having a pair of plane surfaces, a threaded stud freely pivoted to said clamp member, a nut screwed on said stud, said threaded stud affording cooperation between said nut and said adaptor member to render said nut effective to clamp one of said plane surfaces of said adapter member in cooperation with a surface of said bearing means and gauge supporting means against the other plane surface of said adapter member, a first compression spring positioned over said stud and bearing at one end against said clamp member and at its other end against said adapter member, said first compression spring tending to push said adapter member endwise relative to said clamp member, a second compression spring positioned over said stud and acting endwise between said adapter member and the nut screwed on said stud, said second spring being stronger than said first spring and effective to keep the surface of said adapter member which cooperates with said surface of said bearing means in cooperation with said surface in applying the clamp to said spindle nut, and a spherical segment shaped washer positioned over said stud with its convex side positioned for cooperation with gauge supporting means, said nut having a spherical segment shaped inner end for cooperation with the outer concave side of said washer.

7. A gauge attaching clamp for a vehicle having a wheel spindle, a wheel bearing surface and a spindle nut on said spindle and having slots therein, a yoke having arms for disposition over said nut, a pointed member carried by one of said yoke arms for location in one of said slots in said nut, a screw carried by the other yoke arm and having a pointed end for location in an opposite slot in said nut, a threaded stud freely pivoted to said yoke, an adapter sleeve positioned over said stud and having diametrically opposite slots for receiving said arms of said yoke and permitting the yoke to slide in said slots with relatively close fit, said adapter sleeve having a pair of parallel plane surfaces, and a nut screwed on said stud and effective, when said yoke is attached to said spindle nut, to clamp one of said plane surfaces of said adapter sleeve in cooperation with said wheel bearing surface and gauging means against the other plane surface of said adapter sleeve.

8. A gauge attaching clamp according to claim 7 wherein said yoke has a groove for receiving the yoke end of said threaded stud, said groove having an arcuate inner end and of a vertical length combined with looseness at said pivot and between the sides of said stud and said yoke to permit said stud to swivel freely a limited amount in all directions and without moving said adapter sleeve.

9. A gauge attaching clamp according to claim 7 wherein said adapter sleeve is open at one end with one of said plane surfaces thereof at said open end and closed at the opposite end by an end wall having an opening through which said stud passes, the other of said plane surfaces of said adapter sleeve being on said end wall.

10. A gauge attaching clamp according to claim 7 wherein said adapter sleeve is open at one end with one of said plane surfaces thereof at said open end and closed at the opposite end by an end wall having an opening through which said stud passes, the other of said plane surfaces of said adapter sleeve being on said end wall, and a compression spring positioned over said stud and within said adapter sleeve and bearing at one end against said yoke and at its other end against said end wall of said adapter sleeve.

11. A gauge attaching clamp according to claim 7 wherein said adapter sleeve is open at one end with one of said plane surfaces thereof at said open end and closed at the opposite end by an end wall having an opening through which said stud passes, the other of said plane surfaces of said adapter sleeve being on said end wall, a first compression spring positioned over said stud and within said adapter sleeve and bearing at one end against said yoke and at its other end against said end wall of said adapter sleeve, and a second compression spring positioned over said stud and acting endwise between the nut screwed on said stud and the end wall of said adapter sleeve, said second compression spring being stronger than said first spring to keep the adapter sleeve in cooperation with the wheel bearing surface in applying the gauge to the wheel spindle.

12. A gauge attaching clamp according to claim 7 wherein said adapter sleeve is open at one end with one of said plane surfaces thereof at said open end and closed at the opposite end by an endwall having an opening through which said stud passes, the other of said plane surfaces of said adapter sleeve being on said end wall, a first compression spring positioned over said stud and within said adapter sleeve and bearing at one end against said yoke and at its other end against said end wall of said adapter sleeve, a second compression spring positioned over said stud and acting endwise between the nut screwed on said stud and the end wall of said adapter sleeve, said second compression spring being stronger than said first spring and effective to keep the adapter sleeve in cooperation with the wheel bearing surface in applying the gauge to the wheel spindle, and a spherical segment shaped washer positioned over said stud with its convex side positioned for cooperation with gauging means, the nut screwed on said stud having a spherical segment shaped inner end for cooperation with the outer concave side of said washer.

13. A gauge attaching clamp for a vehicle having a wheel spindle and an adjacent plane surface, an attachment member for attachment to said spindle, a threaded stud freely pivoted to said attachment member for disposition substantially coaxial with the axis of said spindle, an adapter sleeve positioned over said stud and having a pair of parallel plane surfaces, and a nut screwed on said stud, said threaded stud affording cooperation between said nut and said adaptor sleeve to render said nut effective, when said attachment member is attached to said spindle, to clamp one of said plane surfaces of said adapter sleeve in cooperation with said plane surface adjacent said spindle and gauge supporting means against the other plane surface of said adapter sleeve.

14. A gauge attaching clamp according to claim 13 wherein there is a compression spring positioned over said stud and within said adapter sleeve and bearing at one end against said attachment member and at its other end against the other end of said adapter sleeve.

15. A gauge attaching clamp according to claim 13 wherein said attachment member comprises a yoke having arms for disposition over a spindle nut on said spindle and screw means carried by said yoke and engageable with said spindle nut.

16. A gauge attaching clamp for a vehicle having a wheel spindle and an adjacent plane surface, an attachment member for attachment to said spindle, a threaded stud freely pivoted to said attachment member for disposition substantially coaxial with the axis of said spindle, an adapter sleeve positioned over said stud and having a pair of parallel plane surfaces, gauge supporting means, and a nut screwed on said stud, said threaded stud affording cooperation between said nut and said adapter sleeve to render said nut effective, when said attachment member is attached to said spindle, to clamp one of said plane surfaces of said adapter sleeve in cooperation with said plane surface adjacent said spindle and said gauge supporting means against the other plane surface of said adapter sleeve, said gauge supporting means having an apertured portion for disposition between said other plane surface of said adapter sleeve and said nut with a slot opening through said gauge supporting means from said aperture to enable applying the gauge supporting means to said adapter sleeve without removing said nut from said spindle.

17. A gauge attaching clamp according to claim 16 wherein the adapter sleeve has an annular flange projecting from said other plane surface thereof which enters the aperture in said gauge supporting means.

18. Gauge attaching means for a vehicle having a wheel hub mounted by anti-friction bearing means on a wheel spindle having a spindle nut comprising, in combination, an attaching member attached to said wheel spindle against movement axially with respect to said spindle, an adapter sleeve having an open end fitting over said spindle nut and presenting a first planar surface, said adapter sleeve having an end wall at its opposite end provided with an axial opening and also having a second planar surface parallel with said first planar surface, a threaded stud connected to said attaching member and extending through the axial opening in the end wall of said adapter sleeve, a gauge supporting member fitting over said stud, and a nut screwed on said stud, said threaded stud affording cooperation between said nut and said adapter sleeve effective to clamp said first planar surface in coopeartion with a surface of said wheel bearing means and said gauge supporting means against said second planar surface.

19. Gauge supporting means according to claim 18 wherein said adapter sleeve has an annular flange fitting in an opening in said gauge supporting member for positioning said gauge supporting member on said adapter sleeve.

References Cited in the file of this patent

UNITED STATES PATENTS

| | | |
|---|---|---|
| 2,032,399 | Button | Mar. 3, 1936 |
| 2,115,347 | Sutton | Apr. 26, 1938 |
| 2,438,358 | Castiglia | Mar. 23, 1948 |
| 2,608,000 | Castiglia | Aug. 26, 1952 |
| 2,608,368 | Bagge et al. | Aug. 26, 1952 |
| 2,645,860 | Bender et al. | July 21, 1953 |
| 2,729,896 | Rosenblum | Jan. 10, 1956 |